Patented May 17, 1932

1,858,488

UNITED STATES PATENT OFFICE

ALBERT K. EPSTEIN, OF CHICAGO, ILLINOIS

PROCESS OF GROWING YEAST

No Drawing.    Application filed October 5, 1925. Serial No. 60,678.

This invention relates to a process of growing yeast to be used as a leavening agent in baking, and has for its object to provide a new and improved process of this description.

In the growth of yeast the yeast needs a supply of nitrogren which can be assimilated by the yeast and changed into the complex nitrogen substances of the yeast cells.

This invention has as a further object to provide a process by means of which this nitrogen is supplied to the yeast without the production of deleterious end products of yeast metabolism which adversely affects the growth of the yeast.

The invention has further objects which are more particularly pointed out in the following description.

In carrying out my process I prepare a yeast nutrient solution containing assimilable carbohydrate and a nitrogen compound containing nitrogen and carbon from which the yeast assimilates the nitrogen leaving the carbon in the form of a residue innocuous to the growth of yeast, the solution being aerated during the yeast propagation.

As a proper nitrogen supplying material I may, for example, use urea which has the following chemical symbol $(NH_2)_2CO$.

In the metabolism of urea by yeast no permanent residue is left which exerts a harmful influence on the yeast growth. The end product of metabolism is carbon dioxide gas which is being aerated and removed during the process.

The urea is added to a wort containing a suitable sugar material and the necessary mineral elements required for yeast metabolism such as calcium, potassium, sodium, magnesium and sulphur and phosphorus.

The yeast converts the nitrogen of the urea into the complex protein of the yeast cell. The nitrogen of the urea may be the only supply of nitrogen in the wort, or it may be added to the wort containing other forms of nitrogen obtained from mashing cereals. The carbohydrate material used in the wort may be derived from cereals or from cane sugar molasses, or beet sugar molasses, or combination of the various carbohydrates which are suitable for yeast food.

It is preferable that at the initial stage of propagation the wort should have an approximate neutral reaction slightly on the acid side varying from a pH6 pH7. This is accomplished by the addition to the wort before the propagation begins of inorganic salts containing no ammonia which will give the wort the proper reaction. I prefer to use various inorganic salts containing phosphates but no ammonia for this purpose. For the purpose of neutralization, organic compounds or a combination of organic and inorganic compounds which do not contain ammonia may also be used for this purpose.

As for example the invention may be carried out by dissolving 250 pounds of beet molasses in 1250 gallons of water. To this solution is added 1.5 pounds of calcium sulphate, 1.5 pounds of magnesium sulphate and sodium phosphates, 4.0 pounds of urea, and the wort is seeded with 10 to 15 pounds of fresh bakers' yeast, and aerated at a temperature ranging from 25° to 30° C. After 30 hours the yeast crop is removed.

The principal feature of this invention consists in utilizing in yeast propagation an organic compound containing nitrogen, carbon, as a source of nitrogen, the yeast converting the nitrogen into albuminous matter and leaving behind the carbon in the form of carbon dioxide which is removed from the wort solution. Thus nothing is left which is detrimental to the growth of yeast. The yeast made by this process is vigorous and will retain its fermenting capacity for a long time.

When the word innocuous is used herein it is used to mean innocuous for yeast and human beings.

If ammonium salts are used in the solution the yeast feeds upon the ammonium leaving the acid portion of the salt, and this acid portion is harmful to the propagation of the yeast. In my process I use non-ammoniacal salts which do not give off any acids injurious to the growth of yeast, thereby preventing this evil.

Carbohydrate material is used as including carbohydrate present in mashed cereal wort or carbohydrate present in cane sugar molasses or sugar beet molasses. In using a combination of the various carbohydrates, I can, therefore, use a mixture of molasses with mashed grain wort.

I claim:—

1. A process of manufacturing yeast which comprises propagating yeast with aeration in a yeast-nutrient solution, which consists of a water solution of molasses, urea and non-ammoniacal inorganic yeast-nutrient salts, the amounts of water, yeast-nutrient substances and aeration being such as to produce high yields of yeast of good baking and keeping qualities.

2. A process of manufacturing yeast which comprises propagating yeast with aeration in a yeast-nutrient solution, which consists of a water solution of carbohydrate material, urea and non-ammoniacal inorganic yeast-nutrient salts, the amounts of water, yeast-nutrient substances and aeration being such as to produce high yields of yeast of good baking and keeping qualities.

3. A process of manufacturing yeast which comprises propagating yeast with aeration in a yeast-nutrient solution, which consists of a water solution of molasses, urea and non-ammoniacal inorganic yeast-nutrient salts; said solution being substantially free from ammoniacal salts, the amounts of water, yeast-nutrient substances and aeration being such as to produce high yields of yeast of good baking and keeping qualities.

4. A process of manufacturing yeast which comprises propagating yeast with aeration in a yeast-nutrient solution, which consists of a water solution of carbohydrate material, urea and non-ammoniacal inorganic yeast-nutrient salts; said solution being substantially free from ammoniacal salts, the amounts of water, yeast-nutrient substances and aeration being such as to produce high yields of yeast of good baking and keeping qualities.

5. A process which comprises propagating yeast in a yeast nutrient solution, which consists of a water solution of carbohydrate material, a substantially pure substance urea, non-ammoniacal inorganic yeast nutrient salts and aerating same during the yeast propagation.

6. A process of manufacturing yeast which comprises propagating yeast in a yeast-nutrient solution, which consists of a water solution of carbohydrate material, a substantially pure substance urea, non-ammoniacal inorganic yeast-nutrient salts, including a sufficient amount of a mixture of phosphates to give an initial reaction of the solution of approximately pH6 to pH7, and aerating the same during yeast propagation.

Signed at Chicago, county of Cook and State of Illinois, this 26th day of September, 1925.

ALBERT K. EPSTEIN.